United States Patent
Han et al.

(10) Patent No.: US 11,776,239 B2
(45) Date of Patent: Oct. 3, 2023

(54) LIVENESS TEST METHOD AND LIVENESS TEST APPARATUS

(71) Applicant: Samsung Electronics Co., Ltd., Suwon-si (KR)

(72) Inventors: Seungju Han, Seoul (KR); Byung Kwan Kim, Suwon-si (KR); Jong-Sok Kim, Hwaseong-si (KR); Sungdo Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 126 days.

(21) Appl. No.: 16/924,544

(22) Filed: Jul. 9, 2020

(65) Prior Publication Data

US 2021/0181305 A1 Jun. 17, 2021

(30) Foreign Application Priority Data

Dec. 12, 2019 (KR) .......................... 10-2019-0165777

(51) Int. Cl.
*G01S 7/41* (2006.01)
*G01S 7/02* (2006.01)
(Continued)

(52) U.S. Cl.
CPC ............ *G06V 10/764* (2022.01); *G01S 7/024* (2013.01); *G01S 7/412* (2013.01); *G01S 13/04* (2013.01); *G01S 13/867* (2013.01); *G06V 10/82* (2022.01); *G06V 40/161* (2022.01); *G06V 40/166* (2022.01); *G06V 40/168* (2022.01); *G06V 40/40* (2022.01)

(58) Field of Classification Search
CPC . G01S 7/41; G01S 7/412; G01S 7/539; G01S 13/9027; G01S 13/867; G06V 40/168; G06T 2207/30201; G06K 9/00906; G06K 9/00268
USPC ............................ 342/55; 382/115, 117, 118
See application file for complete search history.

(56) References Cited

U.S. PATENT DOCUMENTS 7,924,146 B2 * 4/2011 Seder ................... G01S 13/931
345/7
9,672,415 B2 * 6/2017 Pfursich ................. G06V 40/70
(Continued)

FOREIGN PATENT DOCUMENTS

EP 3 382 598 A2 10/2018
KR 10-2014-0072688 A 6/2014
(Continued)

OTHER PUBLICATIONS

Extended European Search Report dated Apr. 20, 2021 in counterpart European Application No. 20203797.4 (7 pages in English).

*Primary Examiner* — Vladimir Magloire
*Assistant Examiner* — Michael W Justice
(74) *Attorney, Agent, or Firm* — NSIP Law

(57) ABSTRACT

Disclosed is a liveness test method and liveness test apparatus. The liveness test method includes determining a presence of a subject using a radar sensor, performing a first liveness test on the subject based on radar data obtained by the radar sensor, in response to the subject being present, acquiring image data of the subject using an image sensor, in response to a result of the first liveness test satisfying a first condition, and performing a second liveness test on the subject based on the image data.

28 Claims, 13 Drawing Sheets

(51) Int. Cl.
*G01S 13/04* (2006.01)
*G01S 13/86* (2006.01)
*G06V 40/16* (2022.01)
*G06V 10/764* (2022.01)
*G06V 10/82* (2022.01)
*G06V 40/40* (2022.01)

(56) References Cited

U.S. PATENT DOCUMENTS

| | | | | |
|---|---|---|---|---|
| 10,102,419 | B2* | 10/2018 | Allyn | G01S 13/89 |
| 10,108,871 | B2* | 10/2018 | Derakhshani | A61B 5/1176 |
| 10,222,469 | B1* | 3/2019 | Gillian | G01S 7/4004 |
| 10,401,490 | B2* | 9/2019 | Gillian | G06F 21/32 |
| 10,591,586 | B2* | 3/2020 | Trotta | G01S 13/878 |
| 10,679,083 | B2* | 6/2020 | Xu | G06V 40/172 |
| 10,690,763 | B2* | 6/2020 | Shouldice | A61B 5/0507 |
| 11,017,209 | B2* | 5/2021 | Sehgal | G06V 10/141 |
| 11,030,470 | B2* | 6/2021 | Han | G06K 9/6288 |
| 11,069,979 | B2* | 7/2021 | Yang | H01Q 21/24 |
| 11,132,065 | B2* | 9/2021 | Gillian | G01S 13/66 |
| 11,138,455 | B2* | 10/2021 | Xu | G06V 40/45 |
| 11,176,392 | B2* | 11/2021 | Yoo | G06V 40/45 |
| 11,256,938 | B2* | 2/2022 | Kwak | G06T 5/20 |
| 2010/0253492 | A1* | 10/2010 | Seder | G01S 13/931 348/148 |
| 2011/0052004 | A1* | 3/2011 | Lee | G06V 40/40 382/118 |
| 2016/0019421 | A1* | 1/2016 | Feng | G06V 40/18 382/117 |
| 2016/0373690 | A1 | 12/2016 | Campos et al. | |
| 2017/0097413 | A1* | 4/2017 | Gillian | G01S 7/415 |
| 2017/0124384 | A1* | 5/2017 | Allyn | G06V 40/166 |
| 2017/0199997 | A1 | 7/2017 | Fadell et al. | |
| 2018/0106897 | A1* | 4/2018 | Shouldice | A61B 5/4818 |
| 2018/0276488 | A1* | 9/2018 | Yoo | G06V 40/172 |
| 2018/0276489 | A1* | 9/2018 | Xu | G06V 40/167 |
| 2019/0011534 | A1* | 1/2019 | Trotta | G01S 13/89 |
| 2019/0187265 | A1* | 6/2019 | Barbello | G06K 9/6201 |
| 2019/0228248 | A1* | 7/2019 | Han | G06V 10/143 |
| 2019/0321719 | A1* | 10/2019 | Gillian | H04Q 9/00 |
| 2019/0349365 | A1* | 11/2019 | Sambhwani | G06N 3/08 |
| 2019/0354662 | A1* | 11/2019 | Min | G06V 10/454 |
| 2020/0019686 | A1* | 1/2020 | Min | H04W 12/06 |
| 2020/0166609 | A1* | 5/2020 | Trotta | G01S 7/412 |
| 2020/0236545 | A1* | 7/2020 | Xu | A61B 5/1135 |
| 2020/0257913 | A1* | 8/2020 | Xu | G06V 40/45 |
| 2020/0293753 | A1* | 9/2020 | Sehgal | H04L 63/0861 |
| 2020/0328532 | A1* | 10/2020 | Yang | H01Q 13/10 |
| 2021/0103031 | A1* | 4/2021 | Cohen | G01S 7/417 |
| 2021/0406569 | A1* | 12/2021 | Yoo | G06V 40/45 |
| 2022/0100831 | A1* | 3/2022 | Moreno | H04L 63/102 |

FOREIGN PATENT DOCUMENTS

| | | |
|---|---|---|
| KR | 10-2015-0128510 A | 11/2015 |
| KR | 10-1653278 B1 | 9/2016 |
| KR | 10-2017-0070754 A | 6/2017 |
| KR | 10-2018-0097403 A | 8/2018 |
| KR | 10-2019-0006370 A | 1/2019 |

\* cited by examiner

LIVENESS TEST METHOD AND LIVENESS TEST APPARATUS

CROSS-REFERENCE TO RELATED APPLICATIONS

This application claims the benefit under 35 USC § 119(a) of Korean Patent Application No. 10-2019-0165777 filed on Dec. 12, 2019 in the Korean Intellectual Property Office, the entire disclosure of which is incorporated herein by reference for all purposes.

BACKGROUND

Field

The following description relates to technology for testing a liveness of an object.

2. Description of Related Art

In a user authentication system, a computing device determines whether to allow an access to the computing device based on authentication information provided by a user. In an example, the authentication information includes a password input by the user or biometric information of the user. The biometric information includes information related to features such as, a fingerprint, an iris, or a face.

Recently, there is a growing interest in face anti-spoofing technology as a security method for user authentication systems. Face anti-spoofing verifies whether a face of a user input into the computing device is a fake face or a genuine face. For this, features such as Local Binary Patterns (LBP), Histogram of Oriented Gradients (HOG), and Difference of Gaussians (DoG) are extracted from the input image, and whether the input face is a fake face is determined based on the extracted features. Face spoofing is in the form of attacks using a photo, a video, or a mask. In face authentication, it is important to identify such attacks.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a liveness test method, including determining a presence of a subject using a radar sensor, performing a first liveness test on the subject based on radar data obtained by the radar sensor, in response to the subject being present, acquiring image data of the subject using an image sensor, in response to a result of the first liveness test satisfying a first condition, and performing a second liveness test on the subject based on the image data.

The liveness test method may include determining whether there may be a human face based on the radar data.

The radar data may be obtained using a portion of antennas in the radar sensor.

The determining may include extracting an intensity feature of a by-distance reception signal from the radar data, and determining the presence of the subject based on the intensity feature.

The determining may include continuously obtaining data from the radar sensor, and determining whether there may be a subject based on the continuously obtained data.

The performing of the first liveness test may include extracting a feature from the radar data, and determining a result of the first liveness test on the subject based on the extracted feature.

The extracting may include extracting, from the radar data, any one or any combination of a distance to the subject, a size of the subject, a direction in which the subject may be positioned, and a shape of the subject.

The acquiring may include activating the image sensor, in response to the result of the first liveness test satisfying the first condition, and acquiring the image data from the activated image sensor.

The performing of the second liveness test may include detecting a face region of the subject in the image data, and performing the second liveness test based on the face region.

The detecting may include detecting the face region in the image data based on the radar data.

The liveness test method may include performing a third liveness test on the subject based on the radar data and the image data, in response to a result of the second liveness test satisfying a second condition.

The performing of the third liveness test may include extracting a first feature based on pixel values of pixels included in a face region in the image data, obtaining another radar data using the radar sensor, extracting a second feature from the another radar data, and determining a result of the third liveness test based on the first feature and the second feature.

The another radar data may be obtained using a plurality of polarization antennas of the radar sensor.

The another radar data may be obtained for each of a plurality of channels using the radar sensor, and the extracting of the second feature may include extracting a channel-based signal feature from the another radar data.

In another general aspect, there is provided a liveness test method, including determining a presence of a subject using a radar sensor, acquiring image data of the subject using an image sensor, in response to the subject being present, and performing a first liveness test on the subject based on the image data.

The determining may include continuously obtaining radar data from the radar sensor, and determining whether the subject may be present based on the obtained radar data.

The acquiring may include activating the image sensor, in response to the determination that the subject may be present, and acquiring the image data from the activated image sensor.

The liveness test method may include performing a second liveness test on the subject based on radar data obtained by the radar sensor and the image data acquired by the image sensor, in response to a result of the first liveness test satisfying a first condition.

The performing of the second liveness test may include extracting a first feature based on pixel values of pixels included in a face region in the image data, obtaining another radar data using the radar sensor, extracting a second feature from the another radar data, and determining a result of the second liveness test based on the first feature and the second feature.

In another general aspect, there is provided a liveness test apparatus, including a radar sensor, an image sensor, and a processor configured to determine a presence of a subject using the radar sensor, perform a first liveness test on the subject based on radar data obtained by the radar sensor, in response to the subject being present, acquire image data of the subject using the image sensor, in response to a result of the first liveness test satisfying a first condition, and perform a second liveness test on the subject based on the image data.

The processor may be configured to continuously obtain data from the radar sensor, and to determine the presence of the subject based on the obtained data.

The processor may be configured to activate the image sensor, in response to the result of the first liveness test satisfying the first condition, and to acquire the image data from the activated image sensor.

The processor may be configured to perform a third liveness test on the subject based on the radar data and the image data, in response to a result of the second liveness test satisfying a second condition.

The radar sensor may be configured to operate while being included in a communication module.

In another general aspect, there is provided a liveness test apparatus, including a radar sensor, an image sensor, and a processor configured to determine whether a subject may be present using the radar sensor, acquire image data of the subject using the image sensor, in response to the subject being present, and perform a first liveness test on the subject based on the image data.

The processor may be configured to perform a second liveness test on the subject based on radar data obtained by the radar sensor and the image data acquired by the image sensor, in response to a result of the first liveness test satisfying a first condition.

In another general aspect, there is provided a liveness test method, including determining a presence of a subject using a radar sensor, performing a first liveness test on the subject based on first radar data obtained by the radar sensor, in response to the subject being present, acquiring image data of the subject using an image sensor, in response the first liveness test satisfying a first threshold, performing a second liveness test on the subject based on the image data, performing a third liveness test on the subject based on second radar data and the image data, in response the second liveness test satisfying a second threshold.

A number of antennas of the radar sensor used to obtain the second radar data may be greater than a number of antennas of the radar sensor used to obtain the first radar data.

A number of antennas of the radar sensor used to obtain the first radar data may be greater than a number of antennas of the radar sensor used to determine the presence of the subject.

Other features and aspects will be apparent from the following detailed description, the drawings, and the claims.

Figure 1:
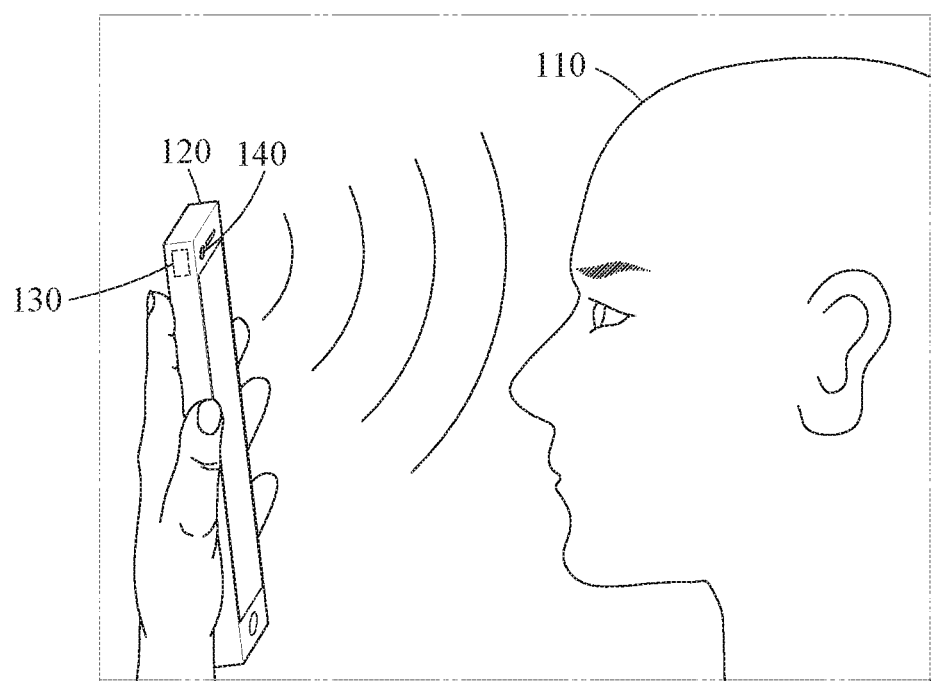
FIGS. 1 and 2 illustrate examples of a biometric authentication and a liveness test.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s). Although terms of "first" or "second" may be used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Hereinafter, examples will be described in detail with reference to the accompanying drawings. Like reference numerals in the drawings denote like elements, and thus their description will be omitted.

Figure 2:
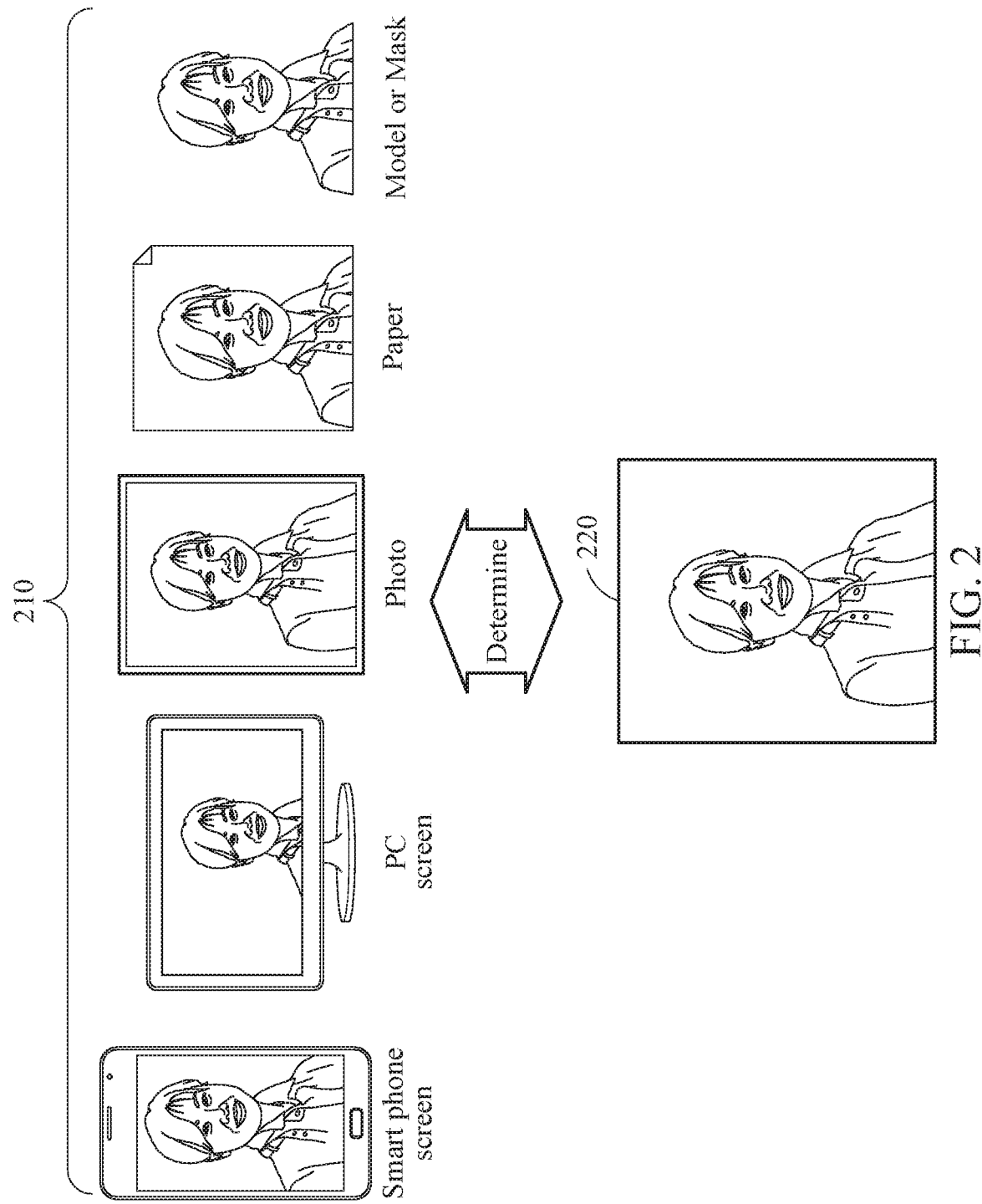

FIGS. 1 and 2 illustrate examples of a biometric authentication and a liveness test.

A biometric authentication is authentication technology using personal biometrics such as a fingerprint, an iris, a face, veins, skin, among authentication technologies for user verification. In the biometric authentication, a face verification determines whether a user is a valid user based on face information of the user attempting an authentication. The face verification is used to authenticate a valid user for a user log-in, a payment service, and an access control.

Referring to FIG. 1, an electronic device 120 performs an authentication process with respect to a user 110 attempting to access the electronic device 120 through a biometric authentication. The electronic device 120 senses an approach of the user 110 using a radar sensor 130 included in the electronic device 120 and, in response to the determination that the user 110 approaches within a distance, performs a biometric authentication (for example, face verification) process with respect to the user 110. The electronic device 120 automatically performs the biometric authentication process using the radar sensor 130, even if the user 110 does not perform a separate manipulation to start the biometric authentication process such as, for example, pressing a button or touching a screen.

In an example, the electronic device 120 performs the biometric authentication process based on radar data obtained using the radar sensor 130 and/or image data acquired using an image sensor 140 such as a camera. The electronic device 120 determines an authentication result by analyzing the radar data and/or the image data. The biometric authentication process includes, for example, a process of extracting features from the radar data and/or the image data, comparing the extracted features to enrolled features related to a valid user, and determining whether an authentication is successful based on the comparison. For example, if the electronic device 120 is being locked, the electronic device 120 may be unlocked in response to the determination that an authentication with respect to the user 110 is successful. In another example, when it is determined that the authentication of the user 110 has failed, the electronic device 120 may continue to remain locked.

A valid user enrolls his/her biometric features in the electronic device 120 in advance through an enrollment process, and the electronic device 120 stores information to be used to identify the valid user in a storage device or cloud storage. For example, a face image of the valid user or face features extracted from the face image are stored as enrolled biometric features of the valid user.

In the biometric authentication process as described above, a liveness test is performed. In an example, the liveness test is performed either before or after the biometric authentication result is determined. In another example, the biometric authentication process and the liveness test process are performed together. The liveness test is to test whether an object being a test subject is an animate object, and to determine whether an authentication means is genuine. For example, the liveness test tests whether a face shown in an image captured by the camera 140 is a genuine face of a person or a fake face. The liveness test is used to discriminate between inanimate objects, such as, for example, a photo, paper, a video, a model, and a mask as fake means, and animate objects, such as, for example, a real face of a person.

FIG. 2 illustrates examples of fake faces 210 and a genuine face 220. The electronic device 120 identifies the genuine face 220 in a test subject image acquired by capturing a real user face, through a liveness test. Further, the electronic device 120 identifies a fake face 210 in a test subject image acquired by capturing a user face displayed on a PC screen or a smart phone screen, a user face in a photo, a user face printed on paper, a model of the user face, through a liveness test.

An invalid user may attempt to cause a false acceptance of a user authentication system using spoofing techniques. For example, in a face verification, the invalid user presents a color photo, a video, or a model or mask of a face of a valid user to the camera 140, to cause a false acceptance. The liveness test prevents a false acceptance by filtering authentication attempts (or spoofing attacks) using a substitute such as a photo, a video, a mask, or a model. In response to the determination that the authentication subject is an inanimate object as a result of the liveness test, the electronic device 120 does not move to a user authentication operation of comparing the input object with an enrolled object to determine matching therebetween, or determines that the user authentication is finally failed irrespective of a user authentication result.

Referring back to FIG. 1, the electronic device 120 performs one of the liveness test and the biometric authentication, or performs both the liveness test and the biometric authentication. The electronic device 120 is, for example, various devices and/or systems such as, for example, a smart phone, a mobile phone, a wearable device, (such as, a ring, a watch, a pair of glasses, glasses-type device, a bracelet, an ankle bracket, a belt, a necklace, an earring, a headband, a helmet, a device embedded in the cloths, or an eye glass display (EGD)), a computing device, for example, a server, a laptop, a notebook, a subnotebook, a netbook, an ultra-mobile PC (UMPC), a tablet personal computer (tablet), a phablet, a mobile internet device (MID), a personal digital assistant (PDA), an enterprise digital assistant (EDA), an ultra mobile personal computer (UMPC), a portable lab-top PC, electronic product, for example, a robot, a digital camera, a digital video camera, a portable game console, an MP3 player, a portable/personal multimedia player (PMP), a handheld e-book, a global positioning system (GPS) navigation, a personal navigation device, portable navigation device (PND), a handheld game console, an e-book, a television (TV), a smart TV, a smart appliance, a home appliance, a smart home device, a biometric door lock, a security device, a security device for gate control, a smart speaker, a robot, various Internet of Things (IoT) devices, a kiosk a vehicle starting device, or a vehicle opening device, and may be performed by an application, middleware, or an operating system installed on the device, or a program of a server interoperating with the corresponding application on the device.

For the liveness test and/or biometric authentication process, the electronic device 120 uses the radar sensor 130 and the image sensor 140. In general, the radar sensor 130 does not have a great power consumption, whereas the image sensor 140 has a relatively greater power consumption. The radar sensor 130 is always or periodically activated for always-on sensing. The radar sensor 130 operates in a communication module that provides a radar function. In an example, the electronic device 120 automatically senses an approach of the user 110 using the radar sensor 130. When the electronic device 120 senses an approach of the user 110, a liveness test based on radar data sensed by the radar sensor 130 is performed, and the image sensor 140 is activated, if a result of the liveness test satisfies a condition. In an example, the electronic device 120 secondarily performs a liveness test based on a face image of the user 110 acquired through the image sensor 140.

If only an image sensor is used without a radar sensor, it is difficult to keep the image sensor, which consumes a greater amount of power, always activated. Thus, the image sensor may be activated through a predetermined trigger motion such as, for example, pressing a switch/button, or touching or moving a screen, to perform the authentication process. In this example, it is impossible to perform an authentication through always-on sensing. Further, due to the characteristics of the image sensor, the performance of the image sensor varies depending on the surrounding lighting environment. Thus, a liveness test using only the image sensor is not robust against two-dimensional (2D) spoofing attacks using a photo or a screen or model/mask-based 3D spoofing attacks.

However, a liveness test apparatus and a liveness test method described herein may perform a liveness test using the radar sensor 130 and the image sensor 140, thereby overcoming the drawbacks described above. The electronic device 120 performs always-on sensing using the radar sensor 130 having a relatively small power consumption and performs a liveness test using the radar data obtained from the radar sensor 130, thereby overcoming the weakness of the image sensor 140 being vulnerable to the surrounding lighting environment. Further, by performing the liveness test based on the radar data including the 3D shape information and material property information of an object, the electronic device 120 may robustly handle 2D spoofing attacks and 3D spoofing attacks. In doing so, spoofing-based false acceptance may be effectively blocked, and the accuracy of a liveness test and a biometric authentication may improve.

Figure 3:
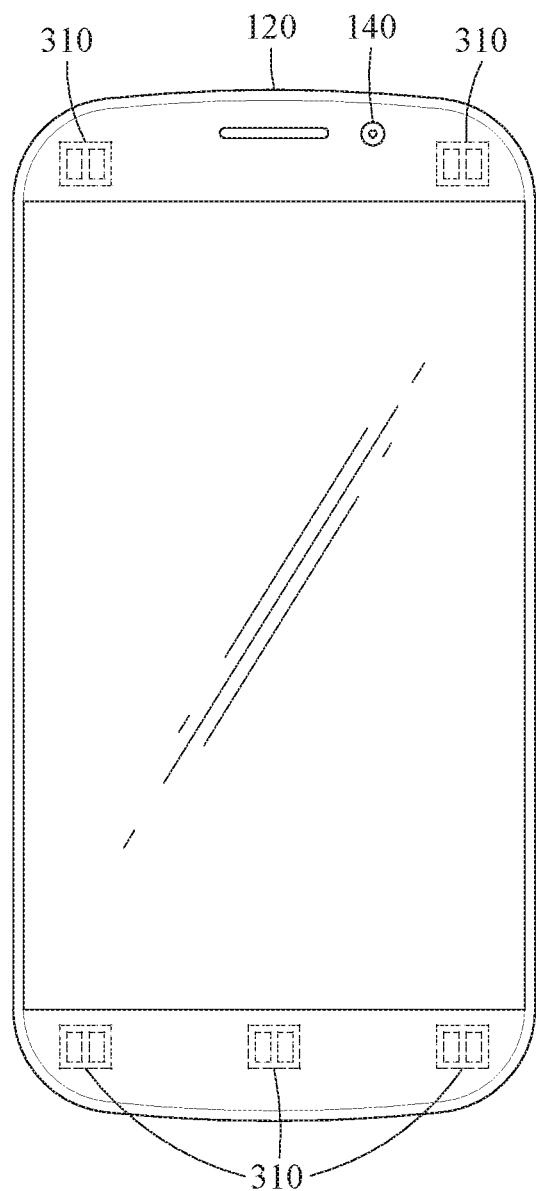
FIG. 3 illustrates an example of an electronic device with a radar sensor and a camera sensor.

FIG. 3 illustrates an example of an electronic device with a radar sensor and a camera sensor.

Referring to FIG. 3, the electronic device 120 includes an image sensor 140 and radar sensors 310. There may be one or more image sensors 140 and one or more radar sensors 310. The image sensor 140 is a sensor configured to acquire image data and includes, for example, a color sensor or an infrared (IR) sensor. The radar sensors 310 are sensors configured to obtain radar data based on reception signals and disposed at various positions in the electronic device 120. A communication module included in the electronic device 120 may perform the function of the radar sensors 310. For example, a communication module providing the IEEE 802.11 ad/ay communication technology may provide the function of the radar sensors 310.

The radar sensors 310 transmit transmission signals through transmission antennas and obtain reflection signals being the transmitted signals that are reflected by an object, through reception antennas. The radar sensors 310 include one or more transmission antennas and one or more reception antennas. In an example, the radar sensors 310 may include a plurality of transmission antennas and a plurality of reception antennas and perform a multiple-input and multiple-output (MIMO) function using the transmission antennas and the reception antennas.

Whether there is an object, and a distance to the object may be determined based on temporal differences between the transmission signals of the radar sensors 310 and the reception signals that are received after being reflected by the object. Further, by analyzing the reception signals obtained through the plurality of reception antennas of the radar sensors 310, 3D shape information and material property information of the object may be extracted. For example, if the object is a face, features such as the size of the face, a 3D shape, a reflection property, a depth of a main point of the face, and a distance between main points of the face may be estimated by analyzing the reception signals.

Figure 4:
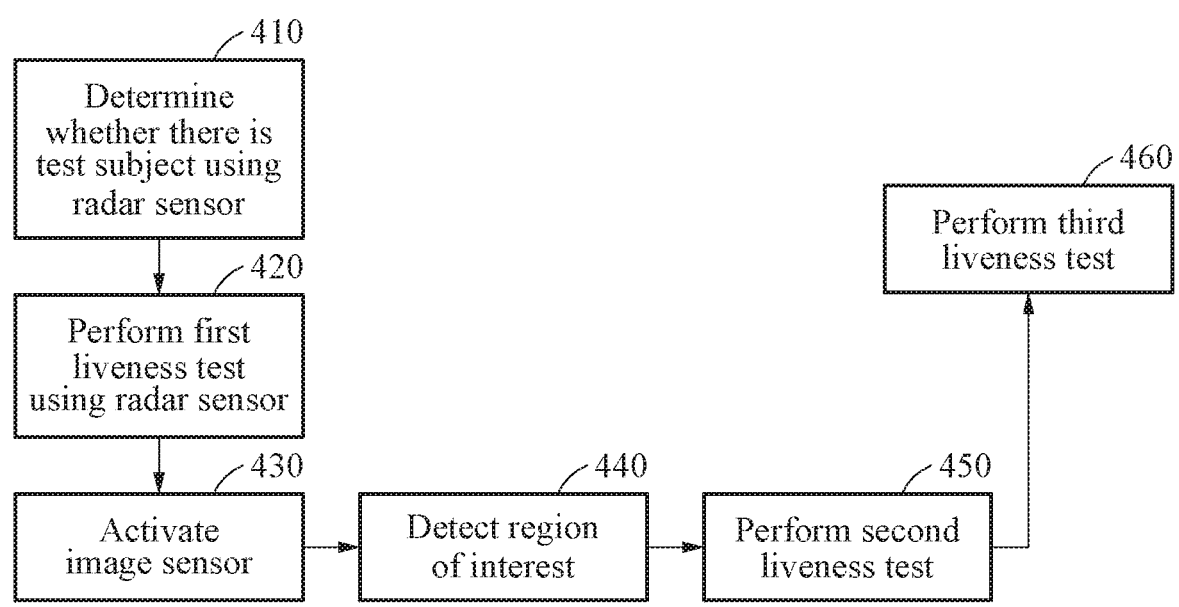
FIG. 4 illustrates an example of a liveness test process.

FIG. 4 illustrates an example of a liveness test process. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. The blocks of the liveness test process of FIG. 4, and combinations of the blocks, are performed by a liveness test apparatus. In an example, the liveness test apparatus is implemented by special purpose hardware-based computer, and devices such as a processor, that perform the specified functions, or combinations of special purpose hardware and computer instructions included in the liveness test apparatus. In addition to the description of FIG. 4 below, the descriptions of FIGS. 1-3 is also applicable to FIG. 4 and are incorporated herein by reference. Thus, the above description may not be repeated here.

Referring to FIG. 4, in operation 410, a liveness test apparatus, which is an apparatus for performing a liveness test, determines whether there is a test subject using a radar sensor. The liveness test apparatus implements always-on sensing technology using the radar sensor that may operate with low power and at short intervals. The liveness test apparatus may perform the function of the radar sensor through a communication module. In an example, the radar sensor uses only a portion of all antennas to determine whether there is a test subject. For example, the radar sensor monitors whether there is a test subject using a transmission antenna and a reception antenna as a pair.

The liveness test apparatus examines whether there is a test subject by analyzing radar data obtained through the radar sensor. The liveness test apparatus calculates a time of flight between a transmission signal and a reception signal based on the radar data and estimates a distance to the test subject based on the calculated time of flight. If the distance to the test subject is less than or equal to a threshold value, the liveness test apparatus determines that there is a test subject. The liveness test apparatus determines whether there is a test subject by analyzing by-distance signal intensities of the reception signal.

When it is determined that there is no test subject, the liveness test apparatus continually or continuously examines whether there is a test subject using the radar sensor. When it is determined that a test subject is present, the liveness test apparatus performs a first liveness test using the radar sensor, in operation 420. The liveness test apparatus obtains radar data using the radar sensor and performs the first liveness test using the obtained radar data. In an example, the radar sensor obtains more detailed radar data using a greater number of antennas that those used in operation 410. The liveness test apparatus extracts features related to the shape of the test subject, curvatures of the test subject, the size of the test subject, material properties of the test subject, a direction in which the test subject is positioned, and a distance to the test subject, by analyzing the radar data. The radar sensor transmits electromagnetic waves, and reception signals obtained when the electromagnetic waves are reflected by the test subject include information associated with material properties. For example, the information associated with material properties changes based on whether the material of the test subject is metal, plastic, or real human skin. Thus, the liveness test apparatus effectively determines whether the test subject is a real person based on the information associated with material properties included in the radar data.

When it is determined that the test subject being is not an animate object but a fake object as a result of the first liveness test, the liveness test apparatus returns to operation 410 and continually or continuously monitors whether there is a test subject. When it is determined that the test subject is an animate object as a result of the first liveness test, the liveness test apparatus activates an image sensor, in operation 430. For example, a wake-up function for the image sensor is performed. The activated image sensor acquires image data. For example, the image sensor acquires one or more photos or videos.

In operation 440, the liveness test apparatus detects a region of interest (for example, a face region) in the image data. In some examples, the radar data may be used to detect the region of interest. For example, in response to a plurality of regions of interest being detected from the image data, a direction or an area in which the test subject is detected may be identified based on the radar data, and a region of interest positioned in the identified direction or area may be determined to be a final region of interest. In another example, a region of interest detected in the image data may be corrected based on information (for example, a direction, a distance, or the size) related to the test subject in the radar data.

In operation 450, the liveness test apparatus performs a second liveness test based on the region of interest. The liveness test apparatus performs the second liveness test using a liveness test model. For example, pixel value information related to the region of interest is input into the liveness test model, and the liveness test model provides a score (for example, an expected value or a probability value) indicating the likelihood of the test subject shown in the region of interest corresponding to an animate object. If the score is greater than a threshold value, the test subject is determined to be an animate object. If the score is less than or equal to the threshold value, the test subject is determined to be a fake object.

The liveness test model described herein may be, for example, a neural network model configured to output a value calculated by internal parameters based on input data. For example, the liveness test model provides a score indicating a feature value, a probability value, or a value that a face object being a test subject corresponds to a genuine face or a fake face, based on the input data. The score is a value being a standard for determining the liveness of the test subject. For example, the liveness test model may be based on a deep convolutional neural network (DCNN) model. In an example, the DCNN model includes a convolution layer, a pooling layer, and a fully connected layer, and provides information for determining the liveness from the input data input into the liveness test model through a computing process performed by each layer. The DCNN model is merely provided as an example. The liveness test model may be based on a neural network model of a structure other than that of the DCNN model.

In another example, the liveness test apparatus calculates a similarity by comparing the result of the first liveness test and a result of detecting the region of interest, and determines the test subject to be an animate object if the calculated similarity is higher than a reference value or determines the test subject to be a fake object if the similarity is less than or equal to the reference value. The liveness test apparatus compares the direction of the test subject, the distance to the test subject, and the size of the test subject, and sets a reference value in view of an error rate for each sensor and a resolution for each sensor.

When the test subject is determined to not be an animate object but a fake object as a result of the second liveness test, the liveness test apparatus returns to operation 410 and continually or continuously monitors whether there is a test subject. When the test subject is determined to be an animate object as a result of the second liveness test, the liveness test apparatus performs a third liveness test using both the radar data and the image data, in operation 460. For the third liveness test, the liveness test apparatus obtains detailed radar data using a plurality of antennas. Preferably, the radar data may be obtained using a maximum number of antennas or using a relatively wide frequency band. The liveness test apparatus obtains the radar data using different channels or a plurality of polarization antennas. When different channels are used, frequency-based features are extracted from the radar data. Polarization characteristic-based features are extracted through the polarization antennas.

The liveness test apparatus extracts features from the radar data and from the image data and obtains a score indicating how likely the test subject is to correspond to an animate object by inputting the extracted features into the liveness test model. Features related to propagation reflection according to the medium of the test subject are extracted from the radar data, and features such as a distance between main parts (for example, both eyes), and the size/shape of a main part (for example, an eye, a nose, or a mouth) are extracted from the image data. In another example, the liveness test apparatus generates combination data by combining the radar data and the image data and inputs the combination data into the liveness test model. The liveness test model provides a score corresponding to the combination data. For example, the liveness test model is implemented as a single neural network model or implemented as a plurality of neural network models.

In some examples, one of the first liveness test, the second liveness test, and the third liveness test may be omitted.

The liveness test apparatus performs a low-power and high-performance liveness test using always-on sensing technology through the process described above. In particular, the liveness test apparatus operates with low power and thus, effectively operates even on a mobile platform. Further, by using radar data and image data together, it is possible to reduce the variation in the performance of the liveness test caused by the surrounding lighting environment and to effectively prevent 2D spoofing attacks and 3D spoofing attacks.

Figure 5:
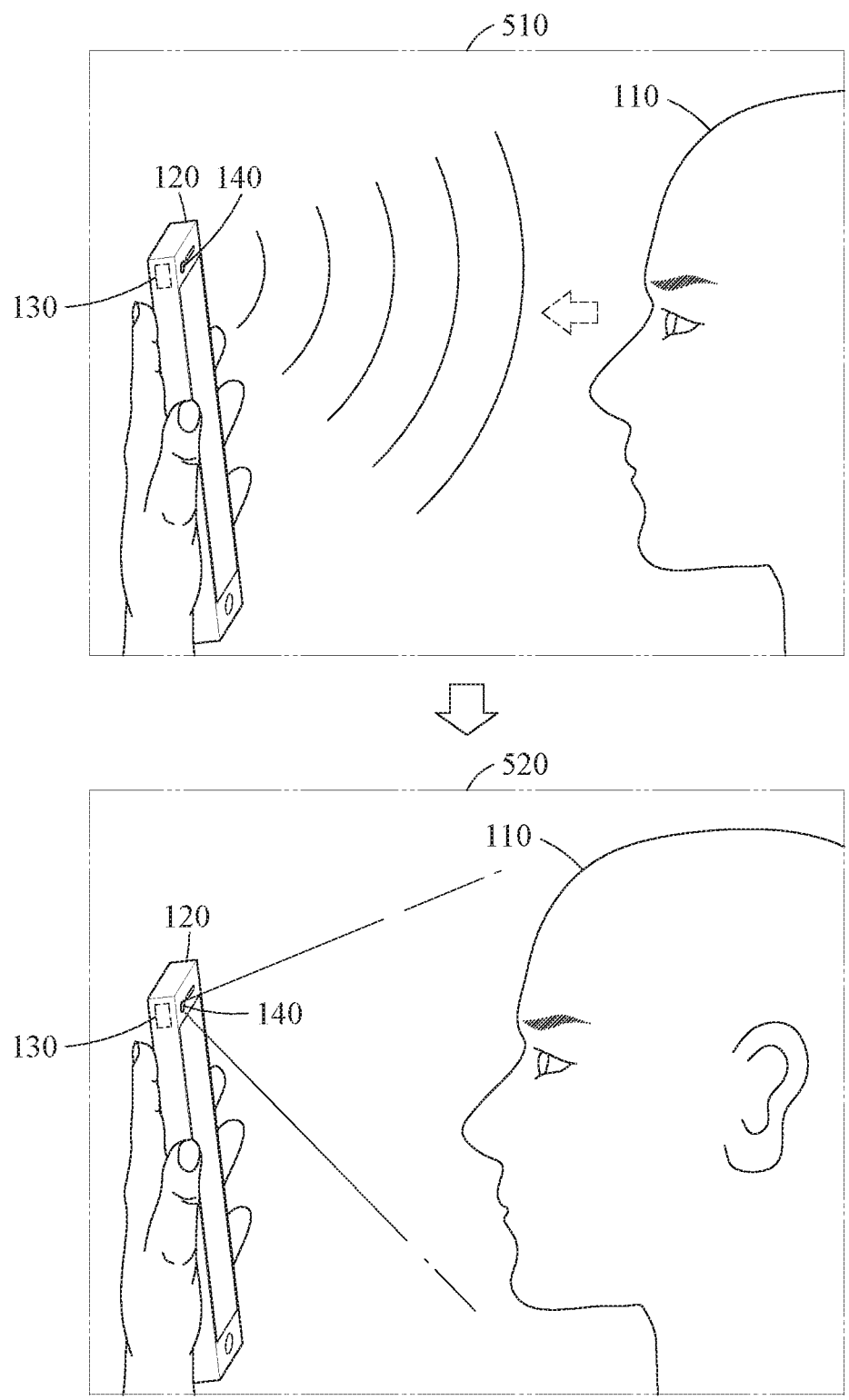
FIG. 5 illustrates an example of controlling the activation of an image sensor based on radar data.

FIG. 5 illustrates an example of controlling the activation of an image sensor based on radar data.

Referring to FIG. 5, in operation 510, the electronic device 120 continually or continuously examines whether there is a test subject using the radar sensor 130. The radar sensor 130 periodically transmits a signal. If the user 110 enters a predetermined area, the signal transmitted from the radar sensor 130 is reflected by the user 110, and the reflected signal is received by the radar sensor 130. The electronic device 120 determines whether there is a test subject close to and in front of the electronic device 120 by analyzing radar data including information related to the received signal.

When it is determined that there is a test subject, the electronic device 120 performs a first liveness test with respect to the user 110 based on the radar data obtained by the radar sensor 130. For example, if the face of the user 110 approaches the electronic device 120, the electronic device 120 automatically recognizes the presence of the face and first performs a liveness test for a face verification process. The electronic device 120 extracts features (for example, reflection features, or 3D shape features) of the test subject from the radar data and determines whether the extracted features correspond to features of an animate object.

In response to a result of the first liveness test satisfying a first condition, for example, in response to the determination that the features extracted from the radar data correspond to the features of an animate object, the electronic device 120 activates the image sensor 140, in operation 520. The activated image sensor 140 acquires image data related to the face of the user 110, and the electronic device 120 performs a second liveness test based on the acquired image data. In response to the result of the first liveness test not satisfying the first condition, the electronic device 120 maintains a current state (for example, a state of being locked). Accordingly, if an actual face of the user 110 is within a field of view (FOV) of the image sensor 140, a face recognition function operates. However, if a medium for a spoofing attack is within the FOV of the image sensor 140, the face recognition function does not operate.

In another example, When it is determined that there is a test subject through the radar sensor 130, the image sensor 140 is activated, and a first liveness test is performed based on image data acquired by the image sensor 140, rather than performing the first liveness test based on the radar data.

The examples described with reference to FIG. 5 may also be performed by the liveness test apparatus described herein, rather than the electronic device 120.

Figure 6:
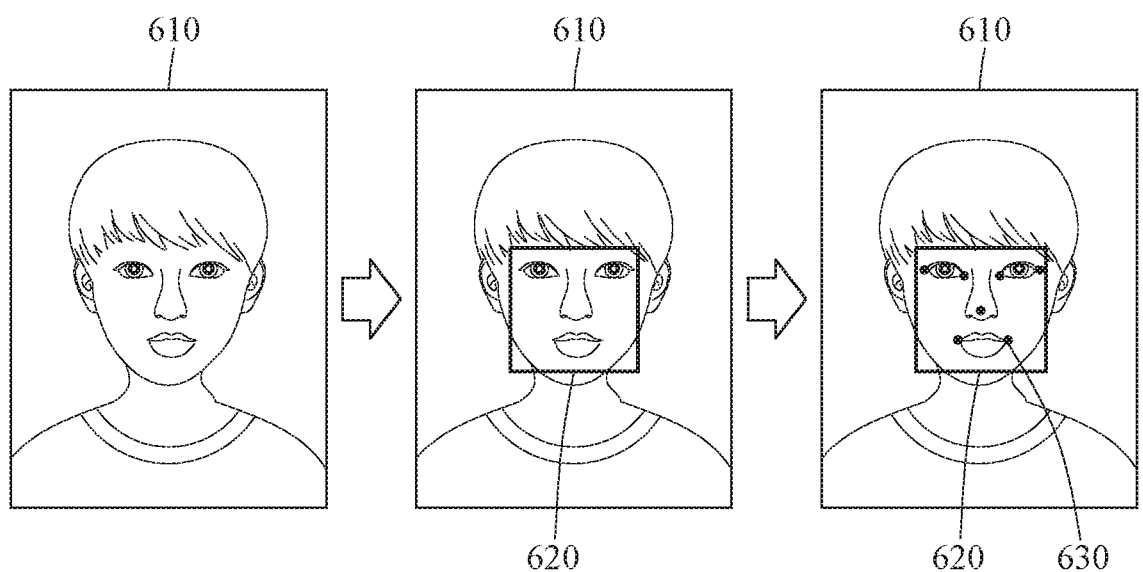
FIG. 6 illustrates an example of detecting a face region in image data.

FIG. 6 illustrates an example of detecting a face region in image data.

Referring to FIG. 6, a liveness test apparatus detecting a face region 620 in image data 610, when performing a liveness test based on the image data 610. For example, the liveness test apparatus detects the face region 620 using, for example, a neural network, a Viola-Jones detector, or a Haar-based cascade AdaBoost classifier. The liveness test apparatus detects feature points 630 corresponding to endpoints of both eyes, a nose tip point, and both corner points of a mouth in the face region 620. For example, the liveness test apparatus detects the feature points 630 using techniques such as Speeded Up Robust Features (SURF), Active Appearance Model (AAM), Active Shape Model (ASM), Supervised Descent Method (SDM), or deep learning. The liveness test apparatus performs image processing such as image scaling or image warping on the face region 620 based on the feature points 630 and performs the liveness test based on the processed face region.

Figure 7A:
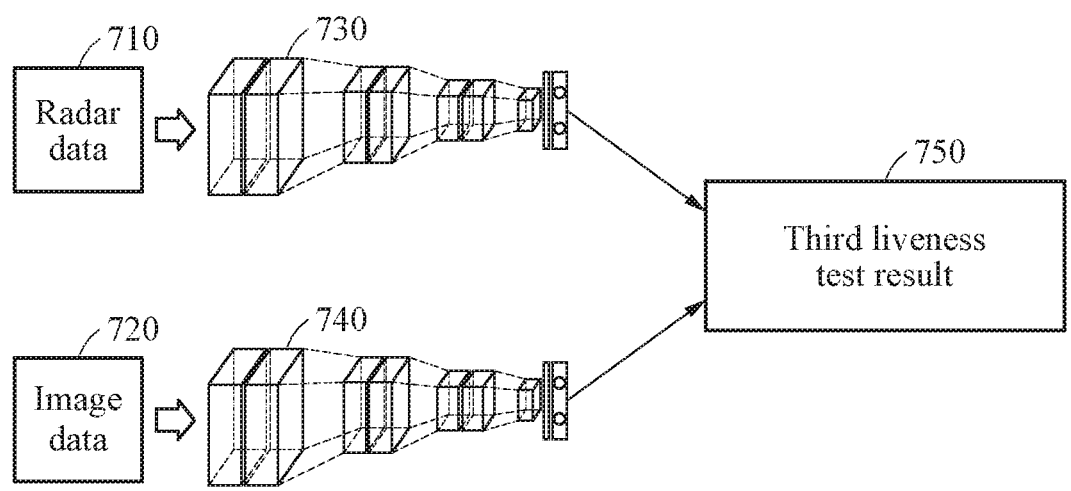
FIGS. 7A and 7B illustrate examples of performing a third liveness test.
Figure 7B:
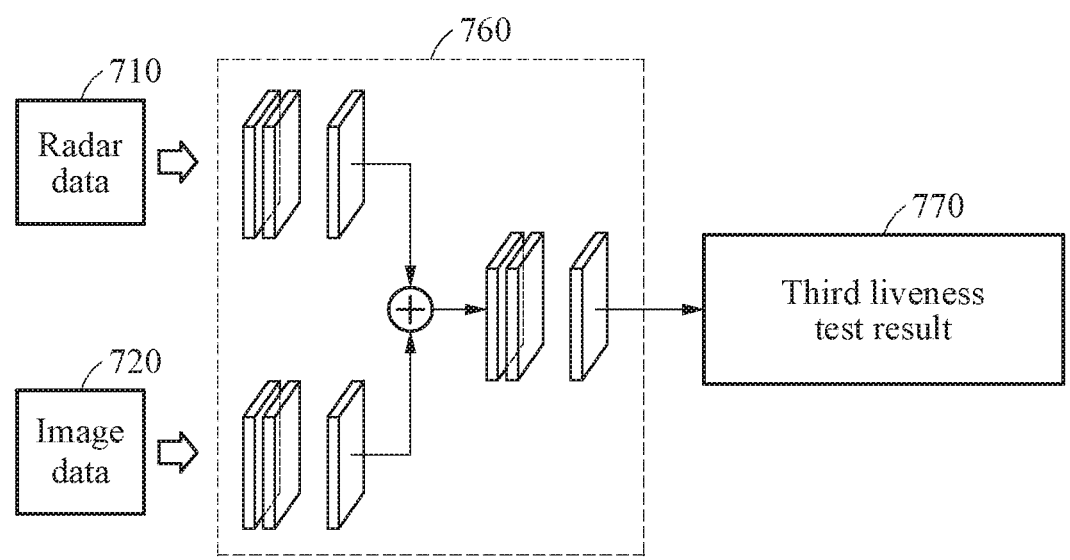

FIGS. 7A and 7B illustrate examples of performing a third liveness test.

Referring to FIG. 7A, a third liveness test is performed based on both radar data 710 and image data 720. The radar data 710 is input into a liveness test model 730, and the liveness test model 730 outputs a first score corresponding to the radar data 710. The image data 720 is input into a liveness test model 740, and the liveness test model 740 outputs a second score corresponding to the image data 720. In this example, the liveness test model 730 for the radar data 710 and the liveness test model 740 for the image data 720 are separately provided. A liveness test apparatus determines a result 750 of the third liveness test with respect to a test subject based on the first score and the second score.

FIG. 7B illustrates an example of using a single liveness test model 760. When the liveness test apparatus performs a third liveness test, the radar data 710 and the image data 720 are input into the single liveness test model 760, and the liveness test model 760 outputs a score with respect to the test subject. The liveness test apparatus determines a result 770 of the third liveness test with respect to a test subject based on the score obtained through the liveness test model 760. As in this example, the liveness test models 730 and 740 of FIG. 7A may be replaced with the single integrated neural network model 760.

Figure 8:
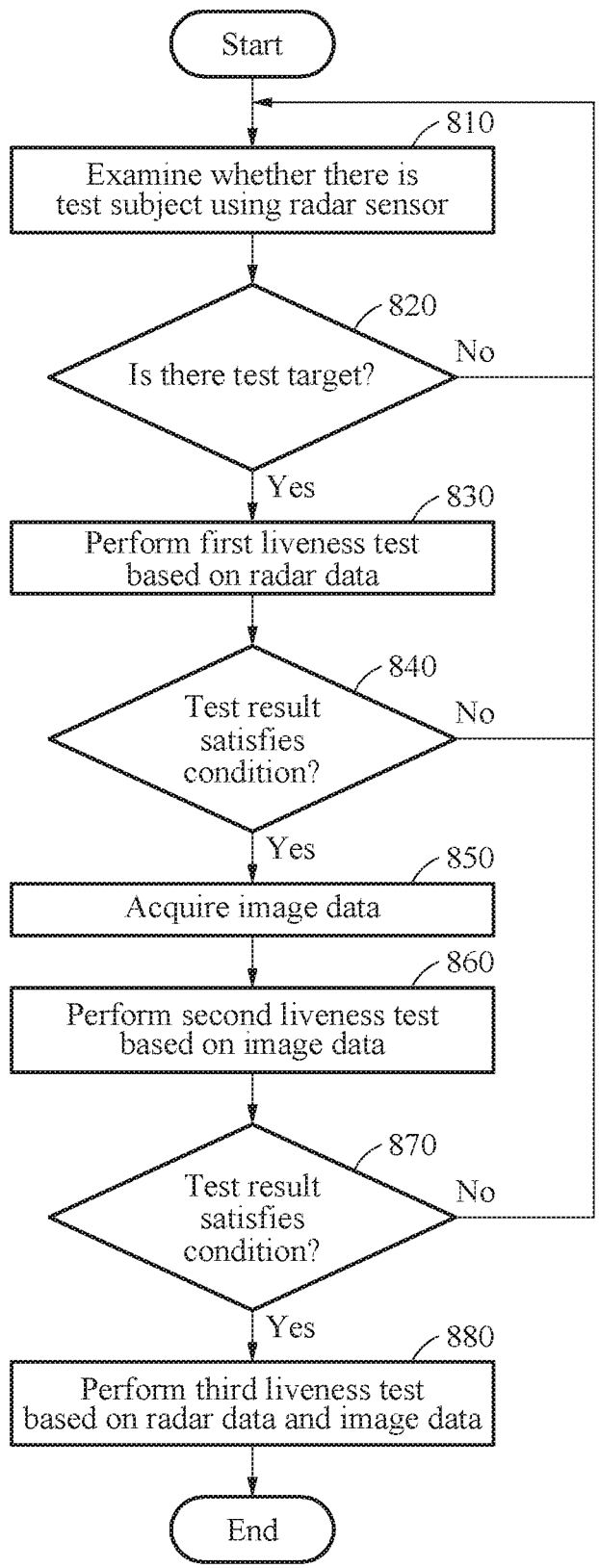
FIG. 8 illustrates an example of a liveness test method.

FIG. 8 illustrates an example of operations of a liveness test method. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently. The blocks of liveness test method is performed by the liveness test apparatus described herein. In an example, the liveness test apparatus is implemented by special purpose hardware-based computer, and devices such as a processor, that perform the specified functions, or combinations of special purpose hardware and computer instructions included in the liveness test apparatus. In addition to the description of FIG. 8 below, the descriptions of FIGS. 1-7 is also applicable to FIG. 8 and are incorporated herein by reference. Thus, the above description may not be repeated here.

Referring to FIG. 8, in operation 810, the liveness test apparatus examines whether there is a test subject using a radar sensor. The liveness test apparatus continually or continuously obtains radar data from the radar sensor and examines whether there is a test subject based on the obtained radar data. For example, the liveness test apparatus monitors whether there is a human face based on the radar data. The liveness test apparatus obtains the radar data using a portion of antennas included in the radar sensor and extracts intensity features of by-distance reception signals from the obtained radar data. The liveness test apparatus estimates information related to the size and shape of a test subject based on the extracted intensity features and examines whether there is a test subject based on the estimated information.

In operation 820, the liveness test apparatus determines whether there is a test subject based on a result of the examining of operation 810. If there is no test subject, the liveness test apparatus returns to operation 810 and continually or continuously examines whether a test subject is present. When it is determined that a test subject is present, in operation 830, the liveness test apparatus performs a first liveness test with respect to the test subject based on the radar data obtained by the radar sensor.

In performing the first liveness test, the liveness test apparatus obtains radar data using a greater number of antennas of the radar sensor than those used in operation 810 and extracts features from the obtained radar data. For example, the liveness test apparatus extracts, from the radar data, one or more features such as a distance to the test subject, the size of the test subject, a direction in which the test subject is positioned, a material property of the test subject, and the shape of the test subject. The liveness test apparatus determines a result of the first liveness test with respect to the test subject based on the extracted features. Testing a liveness of the test subject includes determining whether the test subject is an animate genuine object or an inanimate fake object.

In operation 840, the liveness test apparatus determines whether the result of the first liveness test satisfies a first condition. The result of the first liveness test is determined to be a score indicating the likelihood of the test subject corresponding to an animate object, and whether the condition of score being greater than a threshold is satisfied.

When the result of the first liveness test does not satisfying the first condition, the liveness test apparatus returns to operation 810 and continually or continuously examines whether there is a test subject. When the result of the first liveness test satisfies the first condition, the liveness test apparatus acquires image data related to the test subject using an image sensor, in operation 850. The liveness test apparatus activates the image sensor and acquires the image data from the activated image sensor. As described above, the liveness test apparatus activates the image sensor if it is determined there is a test subject using the radar sensor and the result of the first liveness test determined based on the radar data of the radar sensor satisfies a condition.

In operation 860, the liveness test apparatus performs a second liveness test with respect to the test subject based on the acquired image data. The liveness test apparatus detects a face region of the test subject in the image data and performs the second liveness test based on the detected face region.

The liveness test apparatus detects the face region in the image data using a Viola-Jones detector, a neural network trained to detect a face region, or a Haar-based cascade AdaBoost classifier. However, examples are not limited thereto. The liveness test apparatus may detect the face region in the image data using various face region detection techniques. For example, the liveness test apparatus detects facial landmarks in the image data and detects a bounding region including the detected landmarks, as the face region.

In an example, the radar data obtained by the radar sensor may be used to detect the face region. For example, when a plurality of face regions are detected in the image data, the face region that is subject for the second liveness test is determined based on the position of the test subject or a direction faced by the test subject, which is determined from the radar data.

The liveness test apparatus determines a score with respect to the test subject using a liveness test model that receives an image of the face region as an input, and determines the determined score to be a result of the second liveness test.

In operation 870, the liveness test apparatus determines whether the result of the second liveness test satisfies a second condition. The result of the second liveness test is determined to be a score indicating how likely the test subject is to correspond to an animate object, and whether the condition that the score is greater than a threshold value is satisfied.

When the second liveness test does not satisfy the second condition, the liveness test apparatus returns to operation 810 and continually or continuously examines whether there is a test subject. When the second liveness test satisfies the second condition, in operation 880, the liveness test apparatus performs a third liveness test with respect to the test subject based on the radar data obtained by the radar sensor and the image data acquired by the image sensor.

The liveness test apparatus extracts a first feature based on pixels values of pixels included in the face region of the image data for the second liveness test and extracts a second feature from the radar data obtained using the radar sensor. The first feature and the second feature are extracted using a liveness test model. The liveness test apparatus determines the result of the third liveness test based on the extracted first feature and the extracted second feature.

The liveness test apparatus extracts the first feature based on the pixel values of the pixels included in the face region of the image data. The liveness test apparatus obtains the radar data using the radar sensor and extracts the second feature from the obtained radar data. For example, the liveness test apparatus obtains radar data using the radar sensor including a plurality of polarization antennas or obtains radar data for each of a plurality of channels using the radar sensor. The liveness test apparatus extracts a channel-based signal feature as the second feature from the obtained radar data. The first feature and the second feature are extracted using a liveness test model. The liveness test apparatus determines a result of the third liveness test based on the extracted first feature and the extracted second feature.

In another example, the liveness test apparatus generates combination data by combining the radar data and the image data, extracts a feature from the combination data, and determines the result of the third liveness test based on the extracted feature. When the third liveness test satisfies a third condition, the liveness test apparatus determines the test subject to be an animate object.

The liveness test apparatus performs a control operation in response to the result of the third liveness test with respect to the test subject. In an example, when the test subject is determined to be an animate object, the liveness test apparatus generates a control signal to request execution of a user authentication procedure. In another example, when the test subject is determined to not be an animate object but a fake object, the liveness test apparatus generates a control signal to block an access of the user, without requesting execution of the user authentication process. In another example, the liveness test apparatus returns to operation 810 and continues the examination regarding whether there is a test subject.

In some examples, one of the first liveness test, the second liveness test, and the third liveness test may be omitted from the present liveness test method.

Figure 9:
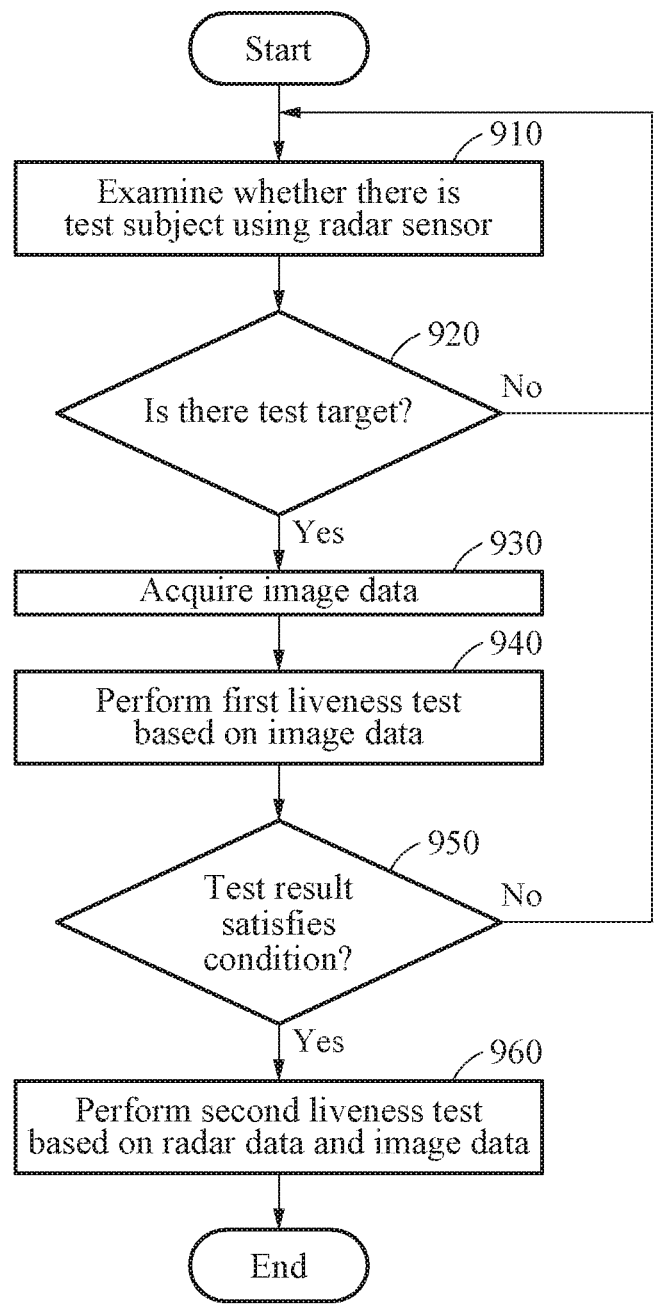
FIG. 9 illustrates an example of a liveness test method.

FIG. 9 illustrates an example of operations of a liveness test method. The operations in FIG. 9 may be performed in the sequence and manner as shown, although the order of some operations may be changed or some of the operations omitted without departing from the spirit and scope of the illustrative examples described. Many of the operations shown in FIG. 9 may be performed in parallel or concurrently. The blocks of liveness test method is performed by the liveness test apparatus described herein. In an example, the liveness test apparatus is implemented by special purpose hardware-based computer, and devices such as a processor, that perform the specified functions, or combinations of special purpose hardware and computer instructions included in the liveness test apparatus. In addition to the description of FIG. 8 below, the descriptions of FIGS. 1-7 is also applicable to FIG. 8 and are incorporated herein by reference. Thus, the above description may not be repeated here.

Referring to FIG. 9, in operation 910, the liveness test apparatus examines whether there is a test subject using a radar sensor. The liveness test apparatus continually or continuously obtains radar data from the radar sensor like the always-on sensing function, and monitors the obtained radar data until a test subject is detected based on the radar data.

In operation 920, the liveness test apparatus determines whether there is a test subject based on a result of the examining of operation 910. When it is determined that there is no test subject, the liveness test apparatus returns to operation 910 and continually or continuously examines whether there is a test subject. When it is determined that a test subject is present, in operation 930, the liveness test apparatus acquires image data with respect to the test subject using an image sensor. In response to the determination that there is a test subject, the liveness test apparatus activates the image sensor and acquires the image data from the activated image sensor.

In operation 940, the liveness test apparatus performs a first liveness test with respect to the test subject based on the image data. The first liveness test in the present example corresponds to the second liveness test described in operation 860 of FIG. 8.

In operation 950, the liveness test apparatus determines whether a result of the first liveness test satisfies a first condition. When the result of the first liveness test does not satisfy the first condition, the liveness test apparatus returns to operation 910.

When the result of the first liveness test satisfies the first condition, the liveness test apparatus performs a second liveness test with respect to the test subject based on the radar data obtained by the radar sensor and the image data acquired by the image sensor, in operation 960. The second liveness test in the present example corresponds to the third liveness test described in operation 880 of FIG. 8.

In an example, the liveness test apparatus extracts a first feature based on pixel values of pixels included in a face region of the image data for the second liveness test and extracts a second feature from the radar data obtained using the radar sensor. The first feature and the second feature are extracted using a liveness test model. The liveness test apparatus determines a result of the second liveness test based on the extracted first feature and the extracted second feature.

In another example, the liveness test apparatus generates combination data by combining the radar data and the image data, extracts a feature from the combination data, and determines a result of the second liveness test based on the extracted feature.

When the result of the second liveness test satisfies a second defined condition, the liveness test apparatus determines the test subject to be an animate object. When the result of the second liveness test does not satisfy the second condition, the liveness test apparatus returns to operation 910 and continually or continuously monitors whether there is a test subject.

Figure 10:
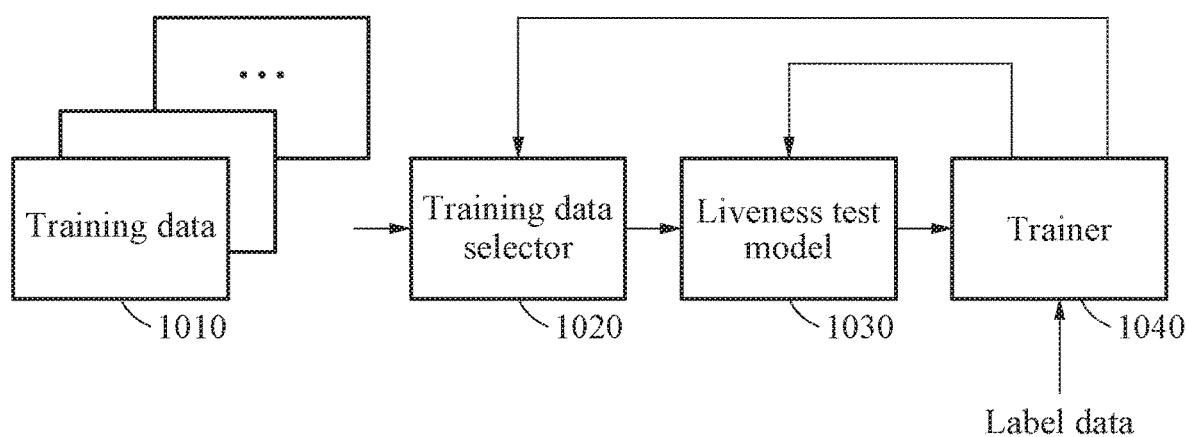
FIG. 10 illustrates an example of a process of training a liveness test model.

FIG. 10 illustrates an example of a process of training a liveness test model.

For the liveness test models described herein, parameters are determined through a training process. Referring to FIG. 10, during the training process, there are prepared numerous training data 1010 and label data including desired value information respectively corresponding to the training data 110. In an example, the training data 1010 may be radar data, image data, or a combination thereof.

A training data selector 1020 selects training data to be used for a current training operation from among the training data 1010. The training data selected by the training data selector 1020 is input into a liveness test model 1030, and the liveness test model 1030 outputs a result value corresponding to the training data through a computation process performed based on internal parameters. In an example, the liveness test model 1030 may be a neural network model and implemented as one or more neural network models.

A trainer 1040 updates the parameters of the liveness test model 1030 based on the result value output from the liveness test model 1030. In an example, the trainer 1040 calculates a loss incurred by a difference between the result value output from the liveness test model 1030 and a desired value included in the label data, and trains the liveness test model by adjusting the parameters of the liveness test model 1030 to reduce the loss. Then, the trainer 1040 controls the training data selector 1020 to select subsequent training data and trains the liveness test model 1030 again based on the selected subsequent training data. By iteratively performing the process as described above with respect to each of the numerous training data 1010, the parameters of the liveness test model 1030 are adjusted gradually as desired. In addition, the trainer 1040 also trains the liveness test model 1030 using various machine learning algorithms.

Figure 11:
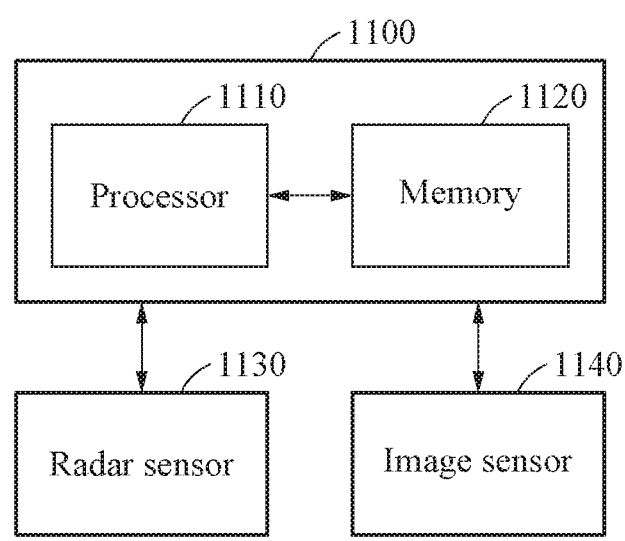
FIG. 11 illustrates an example of a configuration of a liveness test apparatus.

FIG. 11 illustrates an example of a configuration of a liveness test apparatus.

Referring to FIG. 11, a liveness test apparatus 1100 corresponds to the liveness test apparatus described herein. The liveness test apparatus 1100 performs a liveness test based on radar data and/or image data. The liveness test apparatus 1100 includes a processor 1110 and a memory 1120. In some examples, the liveness test apparatus 1100 may further include at least one of a radar sensor 1130 and an image sensor 1140.

The radar sensor 1130 obtains the radar data through antennas. The radar sensor 1130 transmits signals through transmission antennas and receives reflection signals being the transmitted signals that are reflected by an object, through reception antennas. In an example, the radar sensor 1130 samples the signals received through the reception antennas and converts the sampled signals into digital signals. Through the process described above, the radar data is obtained. The image sensor 1140 is a sensor configured to acquire image data and includes sensors such as, for example, a color sensor, an IR sensor, or a depth sensor.

The memory 1120 is connected to the processor 1110 and stores instructions to be executed by the processor 1110, data to be computed by the processor 1110, or data processed by the processor 1110. The memory 1120 includes computer-readable instructions. The processor 1420 performs the above-described operations in response to the instructions stored in the memory 1120 being executed in the processor 1110. The memory 1120 is a volatile memory or a non-volatile memory. The memory 1120 includes a large capacity storage medium such as a hard disk to store the variety of data. Further details regarding the memory 1120 is provided below.

The processor 1110 controls the overall function and operation of the liveness test apparatus 1100 and performs the one or more operations related to a liveness test process described with reference to FIGS. 1 to 10. The processor 1110 performs a liveness test with respect to a test subject using at least one of the radar sensor 1130 and the image sensor 1140.

In an example, the processor 1110 is configured to execute instructions or programs, or to control the liveness test apparatus 1100. The processor 1110 includes, for example, a central processing unit (CPU), a processor core, a multi-core processor, a reconfigurable processor, a multicore processor, a multiprocessor, an application-specific integrated circuit (ASIC), and a field programmable gate array (FPGA), and/or a graphics processing unit (GPU), or any other type of multi- or single-processor configuration. In an example, the liveness test apparatus 1100 is connected to an external device via the one or more of the plurality of communication modules, and exchanges data. Further details regarding the processor 1110 is provided below.

In an example, the processor 1110 determines whether a test subject is present using the radar sensor 1130. The processor 1110 continually or continuously obtains the radar data from the radar sensor 1130 and determines whether there is a test subject based on the obtained radar data. When it is determined that a test subject is present, the processor 1110 performs a first liveness test with respect to the test subject based on the radar data obtained by the radar sensor 1130. When a result of the first liveness test satisfying a first condition, the processor 1110 activates the image sensor 1140 and acquires the image data from the activated image sensor 1140. Then, the processor 1110 performs a second liveness test with respect to the test subject based on the image data. When a result of the second liveness test satisfying a second condition, the processor 1110 performs a third liveness test with respect to the test subject based on the radar data obtained by the radar sensor 1130 and the image data acquired by the image sensor 1140. When a result of the third liveness test satisfies a third condition, the processor 1110 finally determines the test subject to be an animate object.

In another example, the processor 1110 examines whether there is a test subject using the radar sensor 1130. When it is determined that a test subject is present, the processor 110 activates the image sensor 1140 and acquires image data from the image sensor 1140. The processor 1110 performs a first liveness test with respect to the test subject based on the acquired image data. When a result of the first liveness test satisfies a first condition, the processor 1110 performs a second liveness test with respect to the test subject based on radar data obtained by the radar sensor 1130 and the image data acquired by the image sensor 1140. When a result of the second liveness test satisfies a second condition, the processor 1110 determines the test subject to be an animate object.

The processor 1110 generates a control signal based on a final result of the liveness test. For example, when the test subject is determined to be an inanimate object (or fake object) as a result of the liveness test, the processor 1110 generates a control signal to block an access of the object or to reject execution of a requested function.

Figure 12:
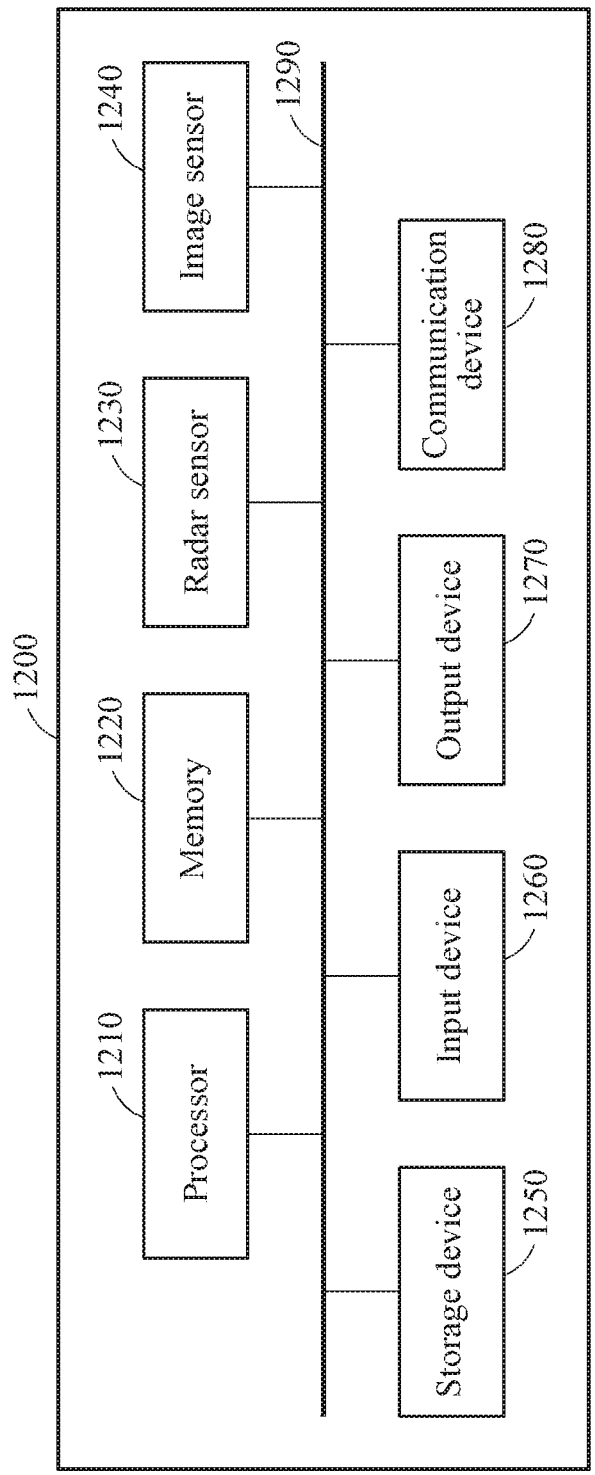
FIG. 12 illustrates an example of a configuration of an electronic device.

FIG. 12 illustrates an example of a configuration of an electronic device.

Referring to FIG. 12, an electronic device 1200 may correspond to the electronic device described herein and perform the function of the liveness test apparatus 1100 of FIG. 11. Thus, the above description of FIG. 12 may not be repeated here. The electronic device 1200 includes a processor 1210, a memory 1220, a radar sensor 1230, an image sensor 1240, a storage device 1250, an input device 1260, an output device 1270, and a communication device 1180. The elements of the electronic device 1200 communicate with each other through a communication bus 1290.

The processor 1210 executes instructions and functions to perform a liveness test and/or a biometric authentication. For example, the processor 1210 processes the instructions stored in the memory 1220 or the storage device 1250. The processor 1210 performs the one or more operations described with reference to FIGS. 1 to 11.

The memory 1220 stores the instructions to be executed by the processor 1210 and information to be used to perform a liveness test and/or a biometric authentication. The memory 1220 may include a computer-readable storage medium.

The radar sensor 1230 obtains radar data through transmission of signals and reception of signals. The image sensor 1240 acquires image data. In an example, the image sensor 1240 includes a color sensor, an IR sensor, and a depth sensor.

The storage device 1250 may include a computer-readable storage medium. The storage device 1250 may store a greater quantity of information than the memory 1220 and store the information for a relatively long time. For example, the storage device 1250 may include a magnetic hard disk, an optical disk, a flash memory, or a floppy disk. Further details regarding the storage device 1250 is provided below The input device 1260 receives an input from a user through a haptic, video, audio, or touch input. For example, the input device 1260 may include a keyboard, a mouse, a touch screen, a microphone, or any device configured to detect an input from a user and transmit the detected input to the electronic device 1200.

The output device 1270 provides an output of the electronic device 1200 to the user through a visual, audio, or haptic channel. The output device 1270 may include, for example, a display, a touch screen, a speaker, a vibration generator, or any device configured to provide an output to the user. The communication device 1280 communicates with an external device through a wired or wireless network.

The liveness test apparatus, the liveness test apparatus 1100, 1200 and other apparatuses, units, modules, devices, and other components described herein with respect to FIGS. 1-12 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-12 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the liveness test method. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, card type memory such as multimedia card, secure digital (SD) card, or extreme digital (XD) card, magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A liveness test method, comprising:
    determining a presence of a subject using a radar sensor;
    performing a first liveness test on the subject based on radar data obtained by the radar sensor, in response to the subject being present;
    acquiring image data of the subject using an image sensor, in response to a result of the first liveness test satisfying a first condition;
    detecting, using the radar data, a face region of the subject in the image data; and
    performing, based on the detected face region of the subject in the image data, a second liveness test on the subject.

2. The liveness test method of claim 1, wherein the determining comprises determining whether there is a human face based on the radar data.

3. The liveness test method of claim 2, wherein the radar data is obtained using a portion of antennas in the radar sensor.

4. The liveness test method of claim 1, wherein the determining comprises:
    extracting an intensity feature of each distance from reception signal of the radar data; and
    determining the presence of the subject based on the intensity feature.

5. The liveness test method of claim 1, wherein the determining comprises:
   continuously obtaining data from the radar sensor; and
   determining whether there is a subject based on the continuously obtained data.

6. The liveness test method of claim 1, wherein the performing of the first liveness test comprises:
   extracting a feature from the radar data; and
   determining a result of the first liveness test on the subject based on the extracted feature.

7. The liveness test method of claim 6, wherein the extracting comprises extracting, from the radar data, any one or any combination of a distance to the subject, a size of the subject, a direction in which the subject is positioned, and a shape of the subject.

8. The liveness test method of claim 1, wherein the acquiring comprises:
   activating the image sensor, in response to the result of the first liveness test satisfying the first condition; and
   acquiring the image data from the activated image sensor.

9. The liveness test method of claim 1, further comprising:
   performing a third liveness test on the subject based on the radar data and the image data, in response to a result of the second liveness test satisfying a second condition.

10. The liveness test method of claim 9, wherein the performing of the third liveness test comprises:
    extracting a first feature based on pixel values of pixels included in a face region in the image data;
    obtaining another radar data using the radar sensor;
    extracting a second feature from the another radar data; and
    determining a result of the third liveness test based on the first feature and the second feature.

11. The liveness test method of claim 10, wherein the another radar data is obtained using a plurality of polarization antennas of the radar sensor.

12. The liveness test method of claim 10, wherein the another radar data is obtained for each of a plurality of channels using the radar sensor, and
    the extracting of the second feature comprises extracting a channel-based signal feature from the another radar data.

13. A non-transitory computer-readable storage medium storing instructions that, when executed by a processor, cause the processor to perform the liveness test method of claim 1.

14. The liveness test method of claim 1, wherein the performing of the second liveness test comprises:
    detecting a region of interest in the image data;
    extracting pixel value information from the region of interest;
    obtaining a score based on inputting the pixel value information into a liveness test model; and
    determining the subject to be an animate object, in response to the score being greater than a threshold.

15. A liveness test method, comprising:
    determining, using a radar data acquired by a radar sensor, a presence of a subject;
    acquiring, in response to the subject being present, image data of the subject using an image sensor;
    detecting, using the radar data, a plurality of regions of interest within the image data;
    detecting, using the radar data, among the plurality of regions of interest within the image data, a face region of the subject in the image data;
    performing, based on the detected face region of the subject in the image data, a first liveness test on the subject based on the image data; and
    performing a second liveness test on the subject based on the radar data obtained by the radar sensor and the image data acquired by the image sensor, in response to a result of the first liveness test satisfying a first condition.

16. The liveness test method of claim 15, wherein the determining comprises:
    continuously obtaining the radar data from the radar sensor; and
    determining whether the subject is present based on the obtained radar data.

17. The liveness test method of claim 15, wherein the acquiring comprises:
    activating the image sensor, in response to the determination that the subject is present; and
    acquiring the image data from the activated image sensor.

18. The liveness test method of claim 15, wherein the performing of the second liveness test comprises:
    extracting a first feature based on pixel values of pixels included in a face region in the image data;
    obtaining another radar data using the radar sensor;
    extracting a second feature from the another radar data; and
    determining a result of the second liveness test based on the first feature and the second feature.

19. A liveness test apparatus, comprising:
    a radar sensor;
    an image sensor; and
    a processor configured to:
      determine a presence of a subject using the radar sensor,
      perform a first liveness test on the subject based on radar data obtained by the radar sensor, in response to the subject being present,
      acquire image data of the subject using the image sensor, in response to a result of the first liveness test satisfying a first condition,
      detect, using the radar data, a face region of the subject in the image data, and
      perform, based on the detected face region of the subject in the image data, a second liveness test on the subject.

20. The liveness test apparatus of claim 19, wherein the processor is further configured to continuously obtain data from the radar sensor, and to determine the presence of the subject based on the obtained data.

21. The liveness test apparatus of claim 19, wherein the processor is further configured to activate the image sensor, in response to the result of the first liveness test satisfying the first condition, and to acquire the image data from the activated image sensor.

22. The liveness test apparatus of claim 19, wherein the radar sensor is configured to operate while being included in a communication module.

23. The liveness test apparatus of claim 19,
    wherein the processor is further configured to perform a third liveness test on the subject based on the radar data and the image data, in response to a result of the second liveness test satisfying a second condition.

24. A liveness test apparatus, comprising:
    a radar sensor;
    an image sensor; and
    a processor configured to:

determine a presence of a subject using the radar sensor, perform a first liveness test on the subject based on radar data obtained by the radar sensor, in response to the subject being present, acquire image data of the subject using the image sensor, in response to a result of the first liveness test satisfying a first condition, and perform a second liveness test on the subject based on the image data, wherein the processor is further configured to perform a third liveness test on the subject based on the radar data and the image data, in response to a result of the second liveness test satisfying a second condition.

25. A liveness test apparatus, comprising:

a radar sensor configured to obtain a radar data;

an image sensor configured to obtain an image data; and a processor configured to:

determine, using the radar data, whether a subject is present;

acquire, in response to the subject being present, an image data of the subject;

detect, using the radar data, a plurality of regions of interest within the image data;

detect, using the radar data, among the plurality of regions of interest, a face region of the subject in the image data;

perform, based on the detected face region of the subject in the image data, a first liveness test on the subject; and perform a second liveness test on the subject based on the radar data obtained by the radar sensor and the image data acquired by the image sensor, in response to a result of the first liveness test satisfying a first condition.

26. A liveness test method, comprising:

determining a presence of a subject using a radar sensor;

performing a first liveness test on the subject based on first radar data obtained by the radar sensor, in response to the subject being present;

acquiring image data of the subject using an image sensor, in response the first liveness test satisfying a first threshold;

performing a second liveness test on the subject based on the image data;

performing a third liveness test on the subject based on second radar data and the image data, in response the second liveness test satisfying a second threshold.

27. The liveness test method of claim 26, wherein a number of antennas of the radar sensor used to obtain the second radar data is greater than a number of antennas of the radar sensor used to obtain the first radar data.

28. The liveness test method of claim 26, wherein a number of antennas of the radar sensor used to obtain the first radar data is greater than a number of antennas of the radar sensor used to determine the presence of the subject.

* * * * *